(12) United States Patent
Kim

(10) Patent No.: US 7,789,423 B2
(45) Date of Patent: Sep. 7, 2010

(54) DEVICE FOR DELAYING PASSENGER AIR BAG EXPANSION

(75) Inventor: Yongsun Kim, Namyangju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 244 days.

(21) Appl. No.: 11/955,620

(22) Filed: Dec. 13, 2007

(65) Prior Publication Data

US 2009/0102174 A1   Apr. 23, 2009

(30) Foreign Application Priority Data

Oct. 17, 2007   (KR) ...................... 10-2007-0104513

(51) Int. Cl.
   *B60R 21/16* (2006.01)
(52) U.S. Cl. .................................... 280/743.2
(58) Field of Classification Search ............... 280/743.2
   See application file for complete search history.

(56) References Cited

U.S. PATENT DOCUMENTS

| 6,254,130 | B1 |   | 7/2001 | Jayaraman et al. |   |
|---|---|---|---|---|---|
| 6,315,323 | B1 | * | 11/2001 | Pack, Jr. ................... | 280/743.2 |
| 6,334,627 | B1 | * | 1/2002 | Heym et al. ............... | 280/743.2 |
| 6,454,300 | B1 | * | 9/2002 | Dunkle et al. ............. | 280/742 |
| 6,616,184 | B2 | * | 9/2003 | Fischer ..................... | 280/743.2 |
| 6,857,659 | B2 | * | 2/2005 | Webber .................... | 280/743.2 |
| 6,869,103 | B2 | * | 3/2005 | Ryan et al. ............... | 280/743.2 |
| 6,991,253 | B2 | * | 1/2006 | Webber .................... | 280/728.3 |
| 2008/0174094 | A1 | * | 7/2008 | Bito .......................... | 280/739 |

FOREIGN PATENT DOCUMENTS

| KR | 2005-101977 | 10/2005 |
|---|---|---|
| KR | 2005-121499 | 12/2005 |

* cited by examiner

*Primary Examiner*—Paul N. Dickson
*Assistant Examiner*—Joselynn Y. Sliteris
(74) *Attorney, Agent, or Firm*—Morgan, Lewis & Bockius LLP

(57) ABSTRACT

The present invention relates to a device for delaying a passenger air bag expansion, including a winding, shaft which is partially wound by a rear end of a tether. A support bracket rotatably supports both ends of winding shaft and is fixed to a bottom of an air bag housing. Winding shaft and support bracket are connected to each other through at least a pin to fix the winding shaft. Pin is broken by expansion force of the tether after a predetermined time period at an early stage of expansion of an air bag. Therefore, the expansion of the airbag cushion is delayed for a predetermined time. Since initial expansion force of airbag cushion is not strong, it prevents a child on a passenger seat from being struck by the airbag cushion.

7 Claims, 5 Drawing Sheets

DEVICE FOR DELAYING PASSENGER AIR BAG EXPANSION

CROSS-REFERENCE TO RELATED APPLICATIONS

The present application is based on, and claims priority from, Korean Application Serial Number 10-2007-0104513, filed on Oct. 17, 2007, the disclosure of which is hereby incorporated by reference herein in its entirety.

FIELD OF THE INVENTION

The present invention relates to a passenger air bag for vehicles, and more particularly to a device to delay a passenger air bag expansion for a predetermined time at an early stage of the air bag expansion so that an injury of a passenger of a passenger seat due to an expansion impact of the air bag is prevented.

BACKGROUND OF THE INVENTION

In recent, the use of a passenger air bag has grown in order to ensure safety of a passenger in addition to a driver when a collision occurs.

In a conventional passenger air bag, as shown in FIG. 1, an air bag housing 2 having an inflator 1 is provided in a crush pad 3 to expand a folded airbag cushion 4 in air bag housing 2 by gas explosion of inflator 1 when a collision occurs, thus preventing an injury of a passenger on a passenger seat due to a collision with crush pad 3.

Additionally, a tether 5 which is made of the same material as airbag cushion 4 is provided in airbag cushion 4 to desirably expand airbag cushion 4, so that airbag cushion 4 stably supports the passenger of the passenger seat.

Furthermore, in a conventional air bag device, folded airbag cushion 4 is expanded at a time due to an operation of inflator 1 but the expansion is not discontinued from a starting time point to an ending time point of the expansion (about 50 ms).

Meanwhile, if a child sits on a passenger seat, he is frequently disposed at a front portion of the passenger seat because he has a keen interest in respects to a forward area and the short femoral region. Accordingly, his face and upper part of the body are disposed to be close to the crush pad 3.

Therefore, he may be strongly struck by airbag cushion 4 which is fully expanded at an early stage of the expansion of airbag cushion 4 when a collision occurs, which causes a significant damage to him.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a device for delaying an expansion of airbag cushion of a passenger air bag device for a predetermined period at an early stage of the air bag expansion, so that a strong strike by the airbag cushion due to the sudden full expansion is prevented to keep a passenger (in particular, children) of a passenger seat from being, injured.

A device for delaying a passenger air bag expansion according to an embodiment of the present invention includes a winding shaft which is partially wound by a rear end portion of a tether of an air bag cushion. A support bracket rotatably supports both distal ends of the winding shaft and is fixed to a bottom of an air bag housing. The winding shaft and the support bracket are connected to each other through at least a pin to fix the winding shaft. The pin is broken by expansion force of the tether after a predetermined time period at an early stage of expansion of an air bag.

According to the present invention having the above-mentioned configuration, expansion of a airbag cushion is delayed for a predetermined time and thus expansion force is not high at an early stage of the expansion of the air bag to prevent a strong strike of the airbag cushion to children, thereby preventing a damage to children on a passenger seat due to the expansion of the air bag.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
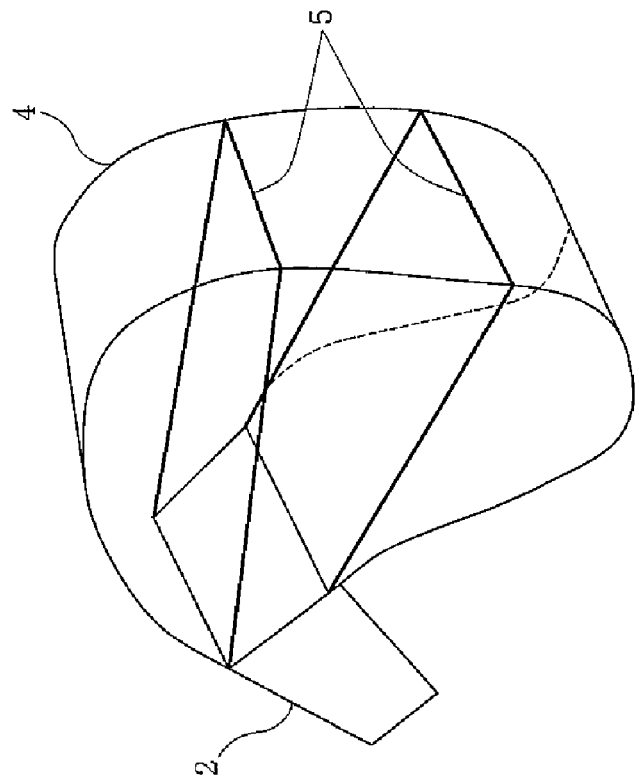
FIG. 1 illustrates a side view and a perspective view of a conventional passenger air bag which is expanded.
Figure 1:
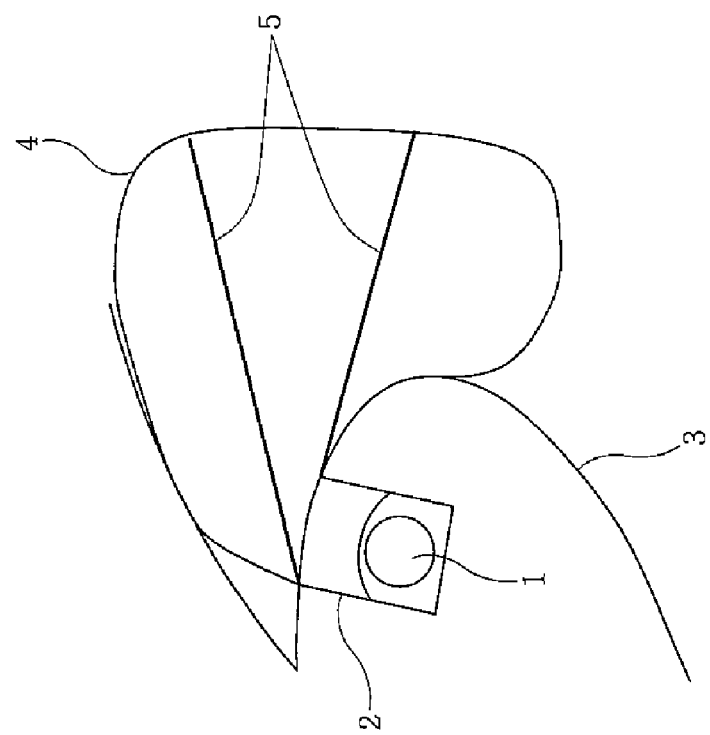
Figure 2:
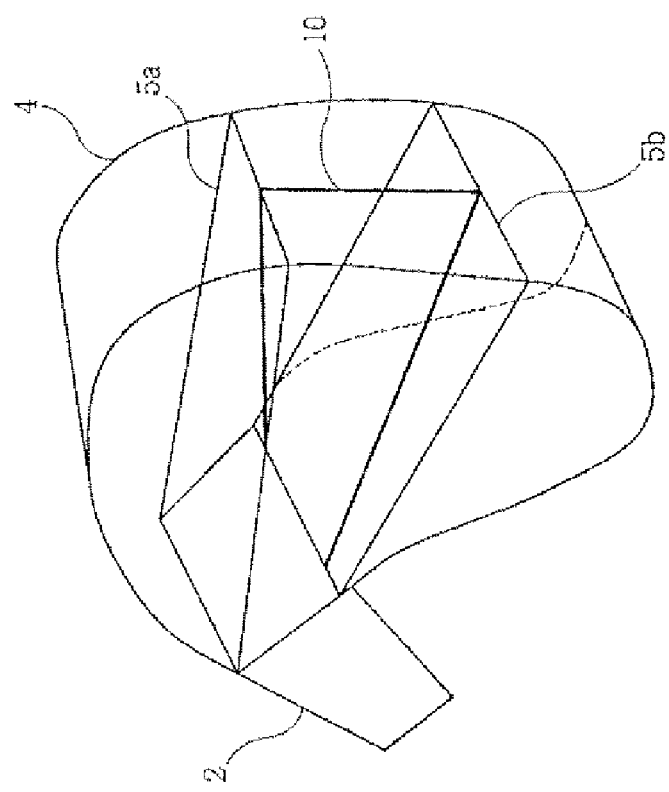
FIG. 2 illustrates a side view and a perspective view of a passenger air bag which is fully expanded according to an embodiment of the present invention.
Figure 2:
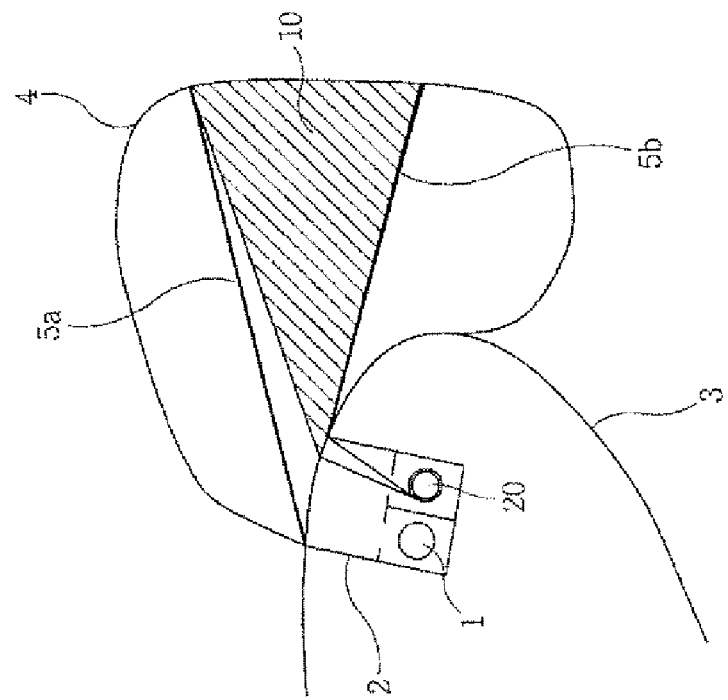

FIG. 2 illustrates a side view and a perspective view of a passenger air bag which is fully expanded according to an embodiment of the present invention, and like reference numerals are used for like and corresponding parts in respects to a known passenger air bag.

In a passenger air bag an air bag housing 2 having an inflator 1 is provided in a crush pad 3, a airbag cushion 4 is folded in air bag housing 2, and an upper tether 5a and a lower tether 5b which are horizontally sewed at a distal end portion thereof are provided in a rear side of airbag cushion 4 so as to be horizontally expanded when being fully unfolded at a predetermined distance.

In addition, an angle tether 10 is provided in airbag cushion 4 to unfold while a distal end portion thereof rotates forwards when the airbag cushion is fully unfolded. The front end portion of angle tether 10 is perpendicularly sewed in respects to a front side (inner side) of airbag cushion 4 between distal end portions of upper tether 5a and a distal end portion of lower tether 5b, and a rear end portion of angle tether 10 is wound around an expansion delaying device 20 as described later. Needless to say, in addition to above-mentioned angle tether 10, any tether which is formed in airbag cushion 4 may be connected to expansion delaying device 20.

Figure 3:
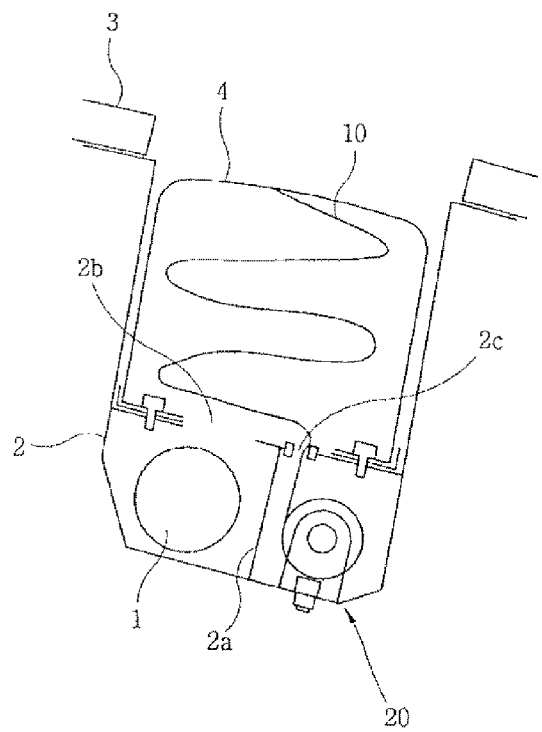
FIG. 3 is a view illustrating a state of a device according to the embodiment of the present invention before operation.

As shown in FIG. 3, expansion delaying device 20 of the present invention is provided in a space separated from inflator 1 by a partition 2a which is formed on a bottom portion of air bag housing 2.

A gas discharging opening 2b is formed in an upper portion of inflator 1 of air bag housing 2, and a drawing opening 2c of angle tether 10 is formed in an upper portion of expansion delaying device 20.

Figure 4:
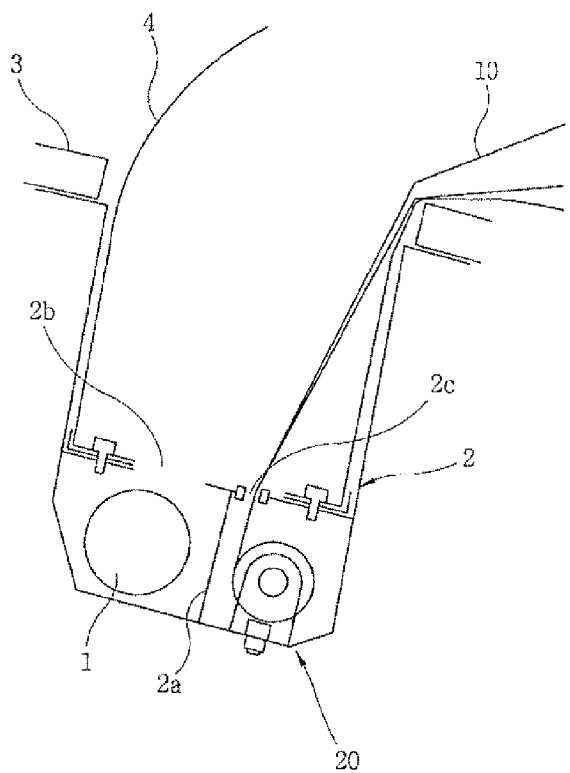
FIG. 4 is a view illustrating a state of the device according to the embodiment of the present invention after operation.

Therefore, as shown in FIG. 4, a partial enlarged view of FIG. 3, angle tether 10 is unfolded in conjunction with airbag cushion 4 when the airbag cushion 4 which is folded in air bag housing 2 is expanded by explosion force of explosion (gas during the operation of inflator 1.

Figure 5:
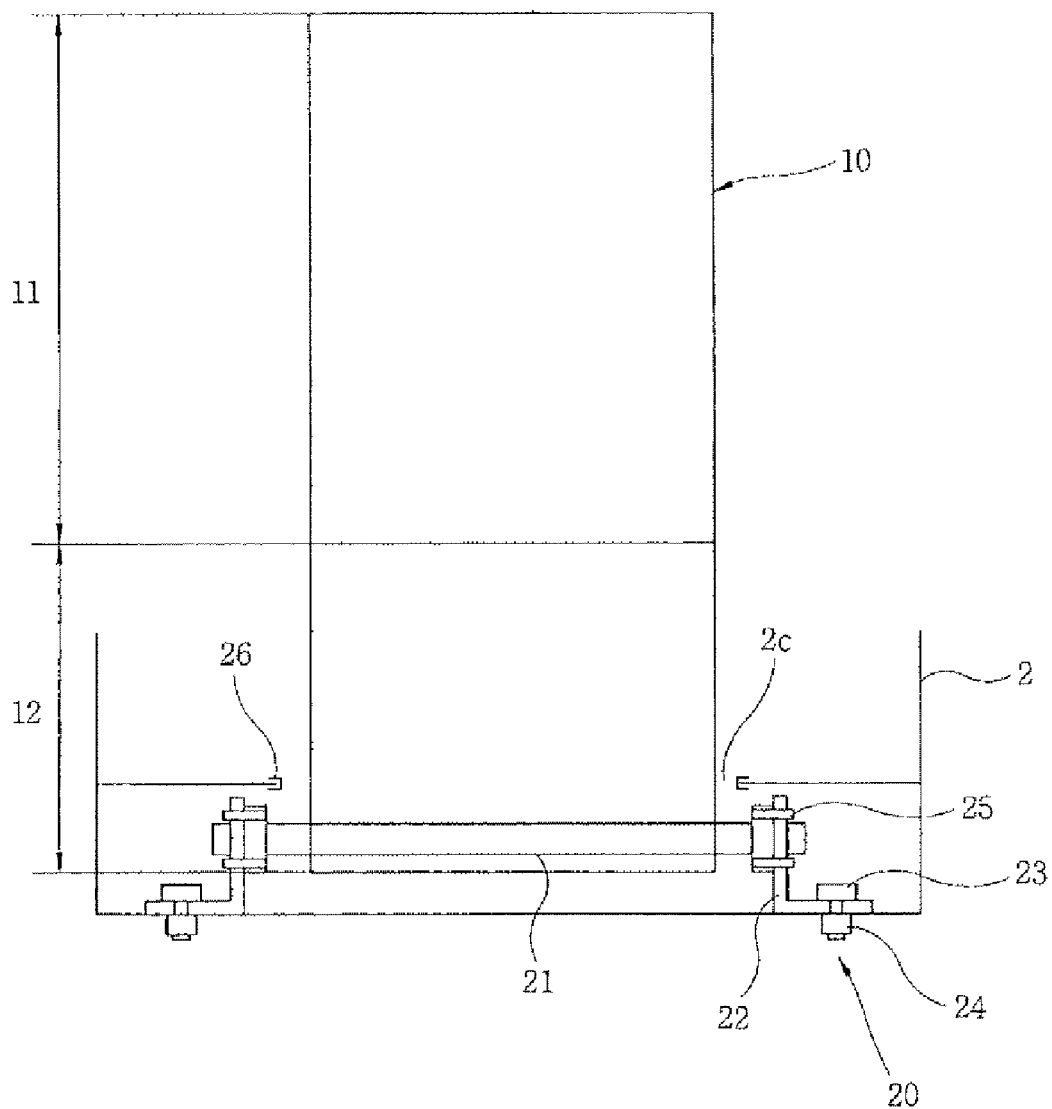
FIG. 5 is a front view of the device according to the embodiment of the present invention.
Figure 6:
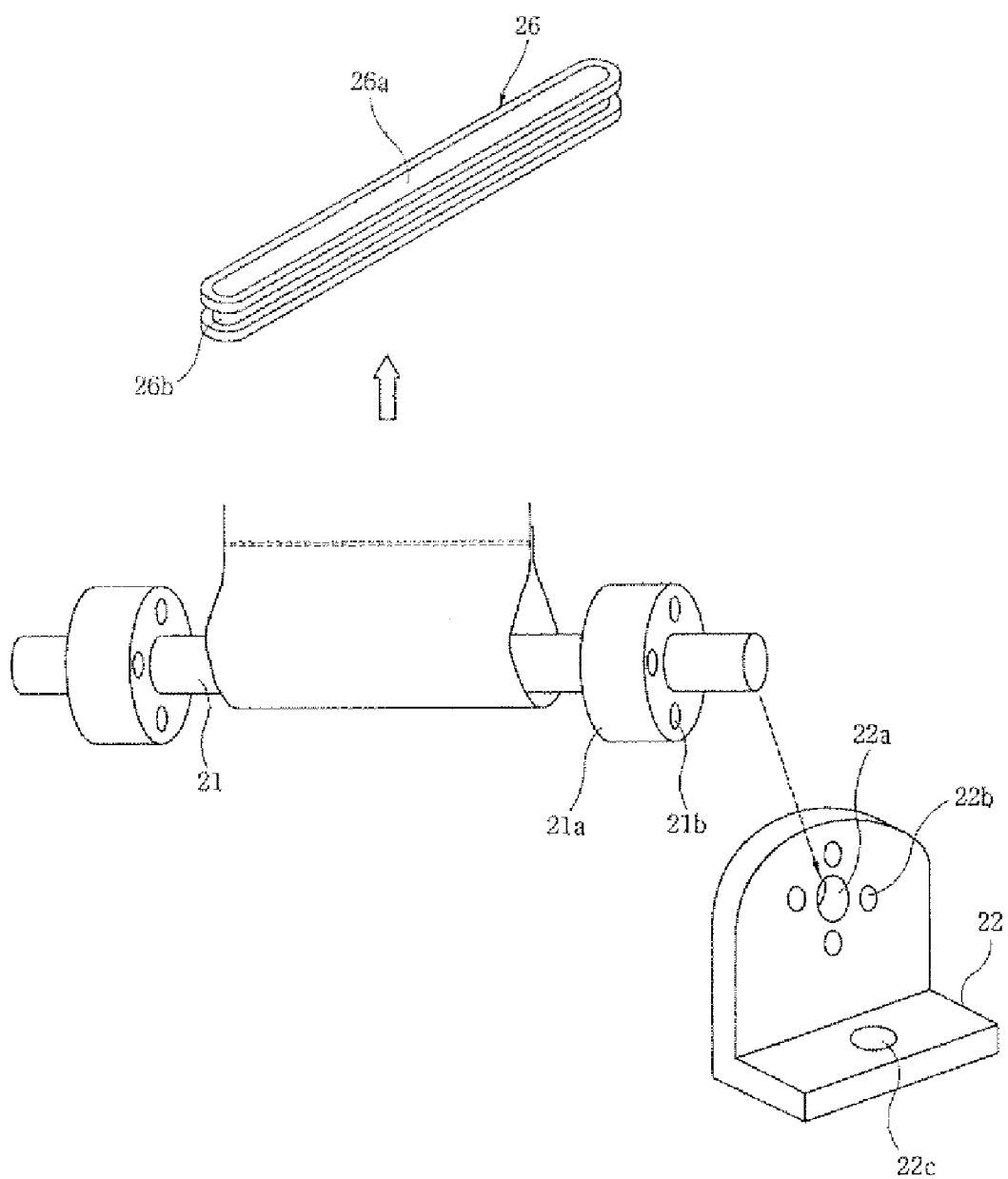
FIG. 6 is an enlarged partial perspective view of constituent elements of the device according to the embodiment of the present invention.

As shown in FIGS. 5 and 6, expansion delaying device 20 according to an exemplary embodiment of the present invention, is provided with a winding shaft 21 which is wound by a rear end portion of angle tether 10, and at least a support bracket 22 which rotatably supports both distal end portions of winding shaft 21 and is fixed to a bottom portion of air bag housing 2.

Disk type flanges 21a may be provided at both distal side portions of winding shaft 21, and at least a pin insertion hole 21b are formed in flange 21a to be circumferentially disposed at regular circular distances.

Support bracket 22 is an L-shaped bracket and a winding shaft support hole 22a is formed in a perpendicular portion of support bracket 22. Accordingly a distal end portion of winding shaft 21 is inserted through the winding shaft support hole 22a so that the winding shaft 21 is rotatably supported thereon. At least a pin insertion hole 22b is formed around a winding shaft support hole 22a so that the position and the number of pin insertion holes 22b of the support bracket 22 may correspond to those of pin insertion hole 21b of flange 21a of winding shaft 21.

In addition, at least a fastening hole 22e is formed substantially in the center portion of a lower portion of support bracket 22, and at least a bolt 23 is inserted into fastening hole 22e and a nut 24 is fastened to an external portion of a lower portion of air bag housing 2 to fix support bracket 22 to a bottom surface of air bag housing 2.

Meanwhile, a rear end portion of angle tether 10 is wound around winding shaft 21 and fixed to the winding shaft 21 as shown in FIG. 6. Particularly, the angle tether 10 comprises an expansion delaying portion 12 and initial expansion portion 11 as shown in FIG. 5.

The initial expansion portion 11 is portion which is expanded at the early expansion of the airbag cushion 4.

The expansion delaying portion 12 positioned at the rear end portion of the tether is wound around winding shaft 21

The expansion delaying portion 12 is obtained by subtracting a length of an initial expansion portion 11 from the full length of the angle tether 10. The expansion delaying portion 12 is unwound after a predetermined time period at an initial expansion stage to a full expansion stage as explained later.

As described above, pin insertion holes 21b of disk type flange 21a may be disposed to have a corresponding position to pin insertion holes 22b of support bracket 22 while the expansion delaying portion 12 is wound, and pins 25 are inserted thereinto.

Each of pins 25 is made of a material such as Nylon 66 and about 3 mm in diameter, and has a pin shape to be inserted into pin insertion holes 21b and 22b. Furthermore, each of pins 25 may be broken by expansion force of angle tether 10 which is expanded in conjunction with airbag cushion 4 after the initial expansion portion 11 is extended at an early expansion stage of the air bag. That is after the initial expansion portion 11 is extended by the expansion power of the airbag cushion 4, further continuous expansion of the airbag cushion 10 may overcome the shearing force of the pins 25 after a predetermined time period. Therefore, the predetermined time period is determined by the total shearing force of the pins 25.

Meanwhile, a tether guide 26 having a long slit 26a transversely formed to accommodate the angle tether 10 is provided at drawing opening 2c formed in air bag housing 2. A groove 26b is formed in tether guide 26 along the external circumference of tether guide 26, and an edge of drawing opening 2c is inserted in groove 26b to fasten the tether guide 26 thereto.

Tether guide 26 helps angle tether 10 to be drawn smoothly through slit 26a and thus the angle tether 10 may be desirably spread, to maintain the rear end portion of angle tether 10 stably, and to keep the front end perpendicularly disposed in a fully expanded state substantially at an angle of 90°.

The operation and the effects of the present invention will be described.

If inflator 1 is operated when a collision occurs, upper/lower tethers 5a and 5b and angle tether 10 are expanded while airbag cushion 4 starts to be expanded.

At this time, an initial expansion portion 11 of angle tether 10 is first expanded at an early stage (about 20 ms after an expansion starting point) of the expansion of airbag cushion 4.

That is, since winding shaft 21 wound with the expansion delaying portion 12 of angle tether 10 does not rotate but be fixed due to pin 25, the expansion delaying portion 12 of angle tether 10 is not drawn and airbag cushion 4 is expanded by only a length that initial expansion portion 11 is allowed.

As described above, since airbag cushion 4 is allowed to be expanded by a limited length, i.e., only the initial expansion portion 11 for a predetermined time period because of the pins 25, the airbag cushion 4 does not strongly strike a child on a passenger seat. That is, the initial expansion portion 11 functions to prevent a child on a passenger seat from being injured by delaying the expansion of airbag cushion 4 for a predetermined time period at an early stage of the air bag expansion.

Meanwhile, as the amount of gas continuously flowing into the airbag cushion 4 is increased as time goes by, further expansion force of airbag cushion 4 is transmitted through angle tether 10 about 25 ms, and thus breaks the pin 25 by overcoming the total shearing force of the pins 25.

Accordingly, winding shaft 21 is unfixed by broken pin 25 to unwind the expansion delaying portion 12 from the winding shaft 21, and thus fully expands the remaining airbag cushion 4.

As described above, airbag cushion 4 of the air bag device according to the present invention is first expanded by length corresponding to initial expansion portion 11 of angle tether 10 by about 20 ms, and additional expansion force of gas is then increased to generate further expansion of the airbag cushion 4 for a predetermined delaying time for about 25 ms during the time period which pin 25 is broken. Next, if pin 25 is broken, remaining expansion delaying portion 12 of angle tether 10 is completely expanded to achieve full expansion of airbag cushion 4 (about 50 ms is required).

As described above, the sudden expansion of airbag, cushion 4 is prevented for a predetermined time period at an early stage of the air bag expansion while the expansion is partially performed, thus preventing a child from being injured by airbag cushion 4 at an early stage of the expansion.

In addition, since initial expansion force of airbag cushion 4 is used to expand the airbag cushion 4, damages to the child are significantly reduced when a strike occurs even though a child moves toward airbag cushion 4. Accordingly, the injury of the child by the air bag is prevented.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A device for delaying a passenger air bag expansion, comprising:
   a winding shaft which is partially wound by a rear end portion of a tether of an air bag cushion;
   at least a support bracket which rotatably supports both distal ends of the winding shaft and is fixed to a bottom of an air bag housing; and
   at least a pin which couples the winding shaft and the support bracket to each other to prevent the winding shaft from rotating and which is broken after a predetermined time period by the tether according to expansion force of the airbag cushion to permit a rotation of the winding shaft.

2. The device for delaying a passenger air bag expansion as defined in claim 1, wherein the winding shaft, the support bracket, and the pin are provided in a space separated from an inflator by a partition in the air bag housing.

3. The device for delaying a passenger air bag expansion as defined in claim 2, wherein a lower portion of the support bracket is fixed to a bottom portion of the air bag housing, a winding shaft support hole is formed in a perpendicular portion thereof to insert a distal end portion of the winding shaft into the winding shaft support hole to rotatably support the winding shaft, a disk type flange having at least a first pin insertion hole is provided at each distal end portion of the winding shaft, at least a second pin insertion hole is formed around the winding shaft support hole of the support bracket so that the pins are inserted into the first and second pin insertion holes of the winding shaft and support bracket.

4. The device for delaying a passenger air bag expansion as defined in claim 1, wherein the tether comprises an expansion delaying portion and an initial expansion portion and the expansion delaying portion includes the rear end portion of the tether that is wound around the winding shaft.

5. The device for delaying a passenger air bag expansion as defined in claim 1, wherein the tether is an angle tether, a front end of which is perpendicularly sewed between distal end portions of an upper tether and a lower tether horizontally spread when the airbag cushion folded in the air bag housing is fully expanded so that the angle tether is substantially perpendicularly spread when the airbag cushion is fully expanded.

6. The device for delaying a passenger air bag expansion as defined in claim 1, wherein a drawing opening is formed in an upper portion of the winding shaft of the air bag housing, and a tether guide having a slit transversely formed around the tether is provided at the drawing opening.

7. The device for delaying a passenger air bag expansion as defined in claim 1, wherein the predetermined time period is determined by the total shearing force of the pins.

* * * * *